United States Patent [19]

Bourn

[11] Patent Number: 4,705,234
[45] Date of Patent: Nov. 10, 1987

[54] RAM WING SURFACE EFFECT VEHICLE

[76] Inventor: Ronald L. Bourn, 780 Beejay Dr., San Diego, Calif. 92154

[21] Appl. No.: 722,124

[22] Filed: Apr. 10, 1985

[51] Int. Cl.[4] .................................................. B64C 35/02
[52] U.S. Cl. .................................. 244/12.1; 244/105; 244/23 R; 114/288
[58] Field of Search ...................... 244/12.1, 23 R, 36, 244/105, 106, 119, 218; 114/288, 271, 272; 180/116, 117

[56] References Cited

U.S. PATENT DOCUMENTS

| 2,367,323 | 1/1945  | Apel         | 114/288  |
|-----------|---------|--------------|----------|
| 2,406,475 | 8/1946  | Rogers       | 244/210  |
| 3,136,505 | 6/1964  | Fleury       | 244/106  |
| 3,190,582 | 6/1965  | Lippisch     | 244/12.1 |
| 3,614,032 | 10/1971 | Purcell, Jr. | 244/36   |
| 3,627,235 | 12/1971 | Lippisch     | 244/12.1 |
| 3,635,035 | 7/1972  | Greer        | 61/67    |
| 3,768,429 | 10/1973 | Greer        | 114/435  |
| 3,830,448 | 8/1974  | Lippisch     | 244/12.1 |
| 3,908,783 | 9/1975  | Joerg et al. | 244/12.1 |
| 3,919,944 | 11/1975 | Jörg         | 180/116  |
| 4,237,810 | 12/1980 | Westfall     | 114/288  |

FOREIGN PATENT DOCUMENTS

| 774448 | 12/1967 | Canada         | 244/12.1 |
| 27771  | of 1912 | United Kingdom | 244/185  |
| 18051  | of 1913 | United Kingdom | 244/185  |

OTHER PUBLICATIONS

Gallington et al. report, "The Ram-Wing Surface Effect Vehicle", dated Jul. 1971.
McMasters et al., report entitled, "Large Winged Surface Effect Vehicles".

Primary Examiner—Joseph F. Peters, Jr.
Assistant Examiner—Lynn M. Fiorito
Attorney, Agent, or Firm—Baker, Maxham & Jester

[57] ABSTRACT

A surface effect vehicle comprises a hull of a generally rectangular shape concave at the front underside and contouring to a flat planing hull at the stern, an upper surface forming an airfoil, a passenger/operators cabin is mounted on top of the hull and support a ram wing and propulsion system.

7 Claims, 33 Drawing Figures

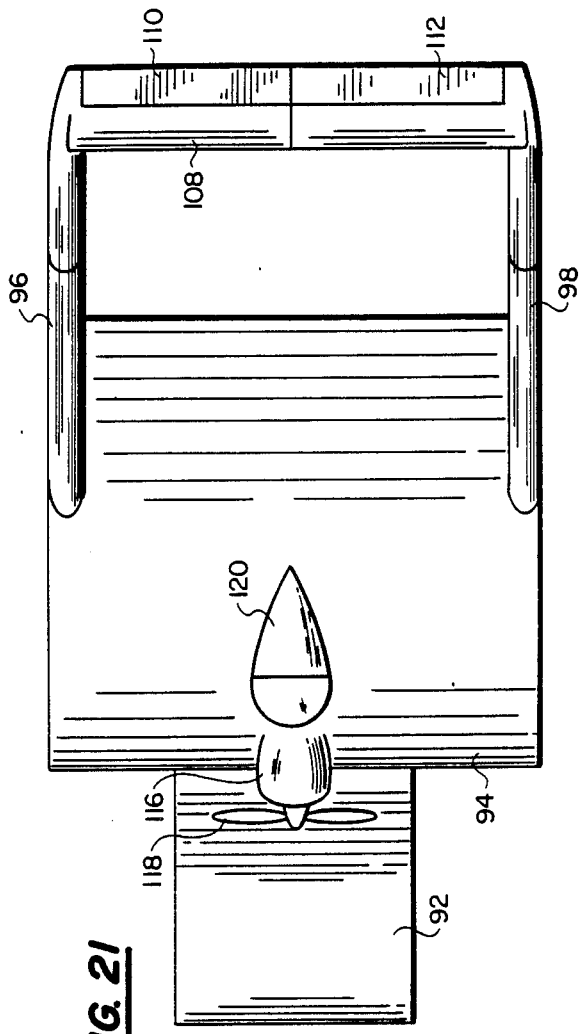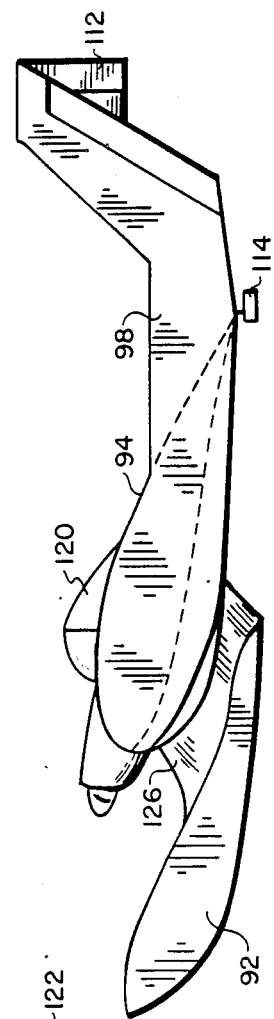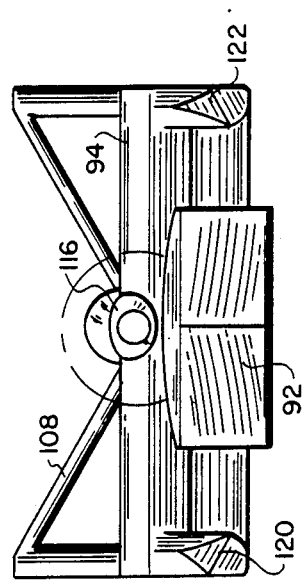

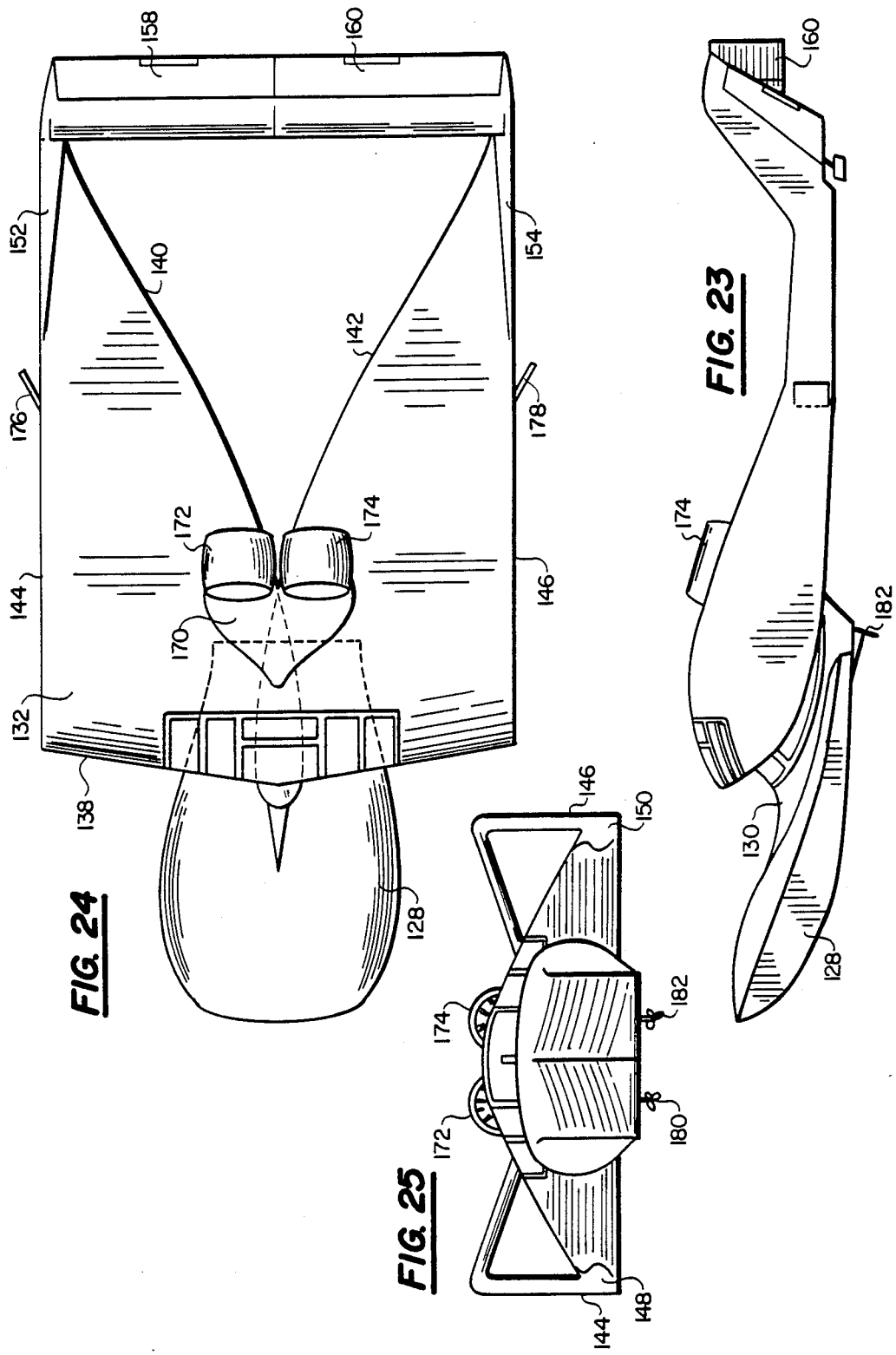

RAM WING SURFACE EFFECT VEHICLE

BACKGROUND OF THE INVENTION

The present invention relates to vehicles and pertains particularly to surface effect vehicles.

A considerable advantage of economy of energy can be achieved when large birds fly close to the water or ground. Birds and man made flying machines that fly in this region are said to be operating in the region of "ground effect". An airborne craft that is designed to operate in this region immediately above the water or terrain is said to be a "ground effect" vehicle or a W.I.G. (wing in ground) vehicle.

The history of man taking advantage of ground effect with conventional flying machines dates back to the period following the great war when German aviators flying the Europe-South American route with flying boats found that as much as fifty percent of their fuel could be saved if they trimmed their craft to fly just above the sea's surface. A considerable amount of work has been carried out since the end of World War II in an effort to produce a stable, purpose-built ground effect vehicle.

The traditional aircraft is designed to fly most efficiently at high speed at high altitude. It is not purpose designed to operate efficiently in the region of ground effect.

It is desirable to construct a purpose designed vehicle capable of operating far more efficiently in the region of ground effect.

SUMMARY AND OBJECTS OF THE INVENTION

It is the primary object of the present invention to provide an improved ground effect vehicle.

In accordance with the primary aspect of the present invention, a ground effect vehicle for efficient operation primarily in the region of ground effect comprised a fuselage for housing passengers and cargo mounted on a hull having a hydrodynamic underside with an aerodynamic upper surface, and aerodynamic wings supported above the fuselage.

BRIEF DESCRIPTION OF THE DRAWINGS

The above and other objects of the present invention will be apparent from the following description when read in conjunction with the accompanying drawings, wherein:

FIG. 20 is a view like FIG. 1 of an alternate embodiment;

FIG. 21 is a view like FIG. 2 of the alternate embodiment;

FIG. 22 is a view like FIG. 3 of the alternate embodiment;

FIG. 23 is a view line FIG. 1 of another embodiment;

FIG. 24 is a view like FIG. 2 of the other embodiment;

FIG. 25 is a view like FIG. 3 of the other embodiment; and

DETAILED DESCRIPTION OF PREFERRED EMBODIMENTS

Referring to FIGS. 1-4, a preferred embodiment of a small passenger ground effect vehicle is illustrated. The vehicle designated generally by the numeral 10 comprises a fuselage 12 mounted on an aero-hydrodynamic hull 14 and having a pair of folding wings attached to the top thereof and extending outward and downward therefrom.

Figure 5:
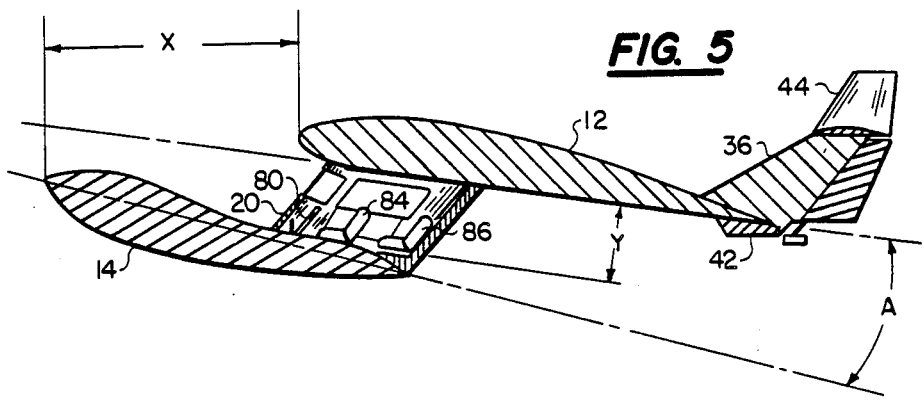
FIGS. 5-8 are schematic side views showing the shift in centers of pressure between minimum and maximum ground effect.
Figure 6:
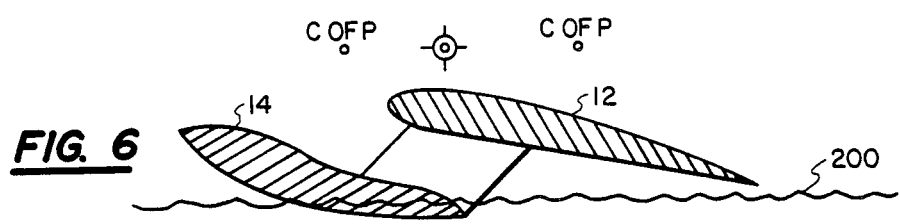
Figure 7:
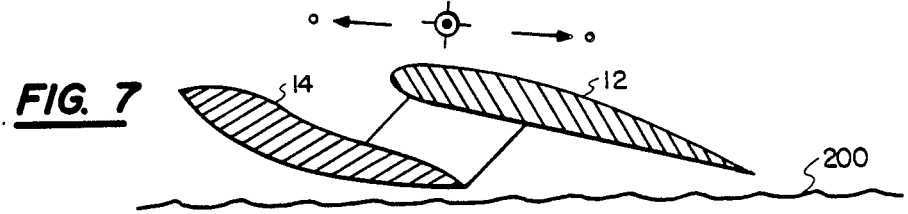
Figure 8:
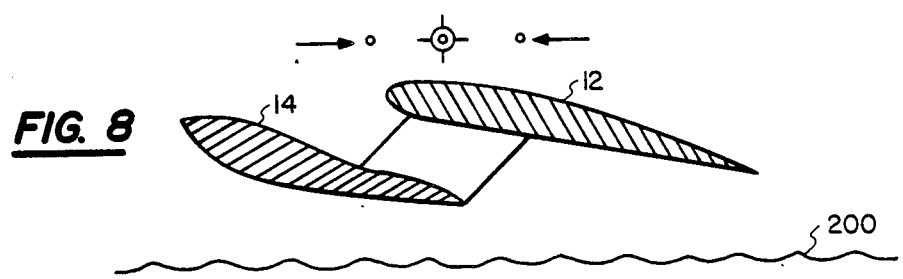
Figure 9:
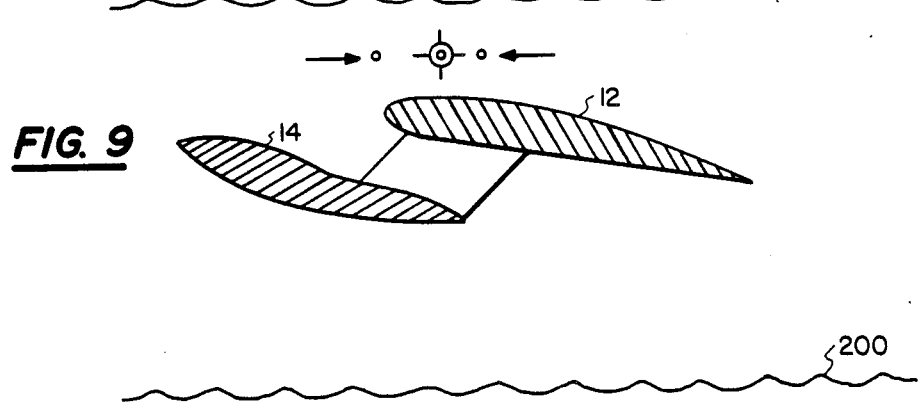
FIG. 9 is a sectional view along lines 9—9 of FIG. 2 showing regions of critical dimension.

The fuselage forms a box-like cabin 20 for housing the pilot or operator and from one up to five or more passengers. The cabin is positioned on the center line and aft of the center of the hull 12 as seen in FIG. 5. The cabin 24 is provided with the usual forward windshield 26 for forward visibility and with side windows 28 (one shown) for lateral visibility.

The aerodynamic hull 14 is designed to be both a displacement hull and a planing hull when in contact with the water and has an upper surface that is configured to provided aerodynamic lift such that the hull, especially in combination with the main wings of the vehicle, assists in stabilizing the vehicle when airborne within the surface effect region just above a water or ground surface over which the vehicle is travelling. The hull has a generally rectangular configuration in plan view and has a longitudinal axis coinciding generally with that of the fuselage of the craft. The hull 14 may also be designed with compartments or the like for carrying cargo and the like.

Disposed at the forward end of the fuselage 12 and above the cabin 24 is a power plant 30 such as, for example, an internal combustion engine driving a propeller 32 for providing air propulsion for the vehicle. The engine may also be drivingly connected such as through drive shafts, belts, and the like (not shown) to a water screw or propeller 34 (FIG. 1) for providing water propulsion for low speed maneuverability and also for water propulsion up to the point of lift off of the vehicle from the water surface. The vehicle is contemplated to operate predominantly from and over bodies of water.

The fuselage 12 extends backward along and defining a longitudinal axis of the vehicle to a tail structure, including a vertical stabilizer 36 having an air rudder 38 hinged thereto with a water rudder 40 extending downward the air rudder for engaging the water when operating on the water. A float 42 is incorporated in the tail end of the fuselage for supporting on the surface of the water. A pair of elevons (combination elevators and alerons) are pivotally mounted on and extend outward and upward at an angle to the vertical stabilizer forming generally a "T" tail and preferably having a dihederal angle of approximately fifteen degrees or so. The elevons also preferably include removable end sections 44a and 46a for compactness when conditioned for storage or transport.

Figure 4:
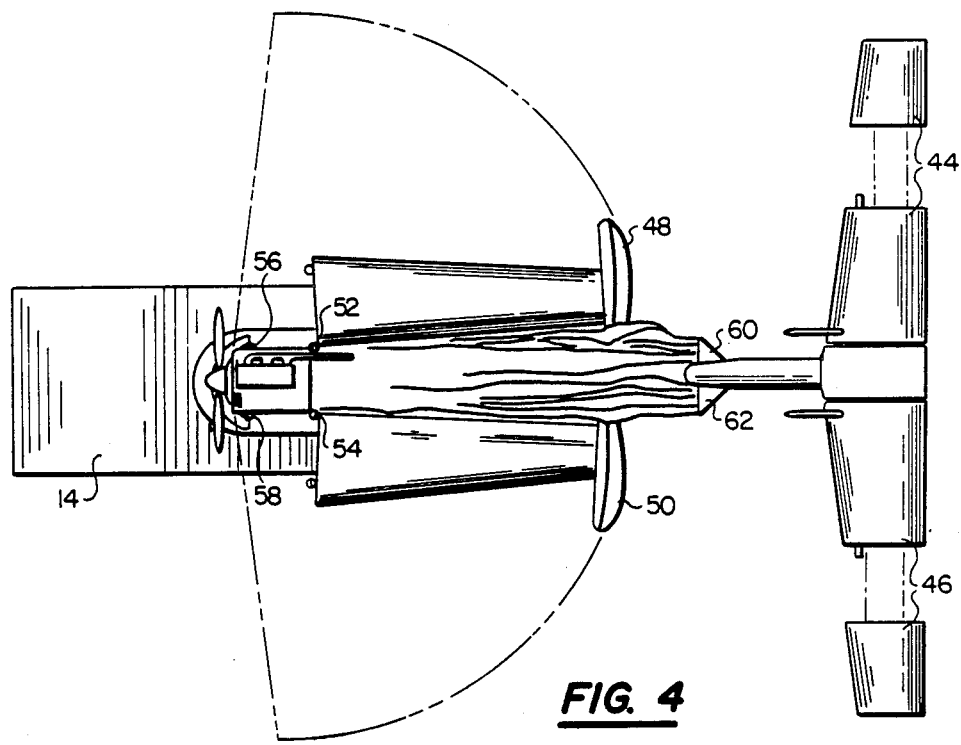
FIG. 4 is a view like FIG. 2 with the wings folded.

The aerodynamic wing structure of the aircraft comprises a pair of generally rigid elongated D section wing members 16 and 18 extending outward from the fuselage and angled downward terminating in a pair of wing tip floats 48 and 50 which may also function as fuel tanks. The rigid wing structure members 16 and 18 are preferably constructed of a generally D section and are pivotally or hingedly connected to the fuselage at the trailing edge thereof by hinge members 52 and 54 (FIG. 4). One or more clevis type pin connections are at the forward portion of the wing for connecting the wings in their outward extending position and for releasing the wings for folding backward as shown in FIG. 4.

Figure 1:
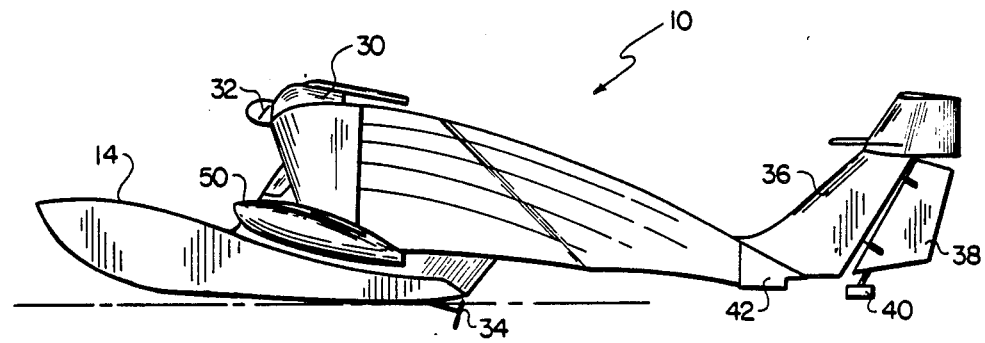
FIG. 1 is a side elevation view of a preferred embodiment of the invention.
Figure 2:
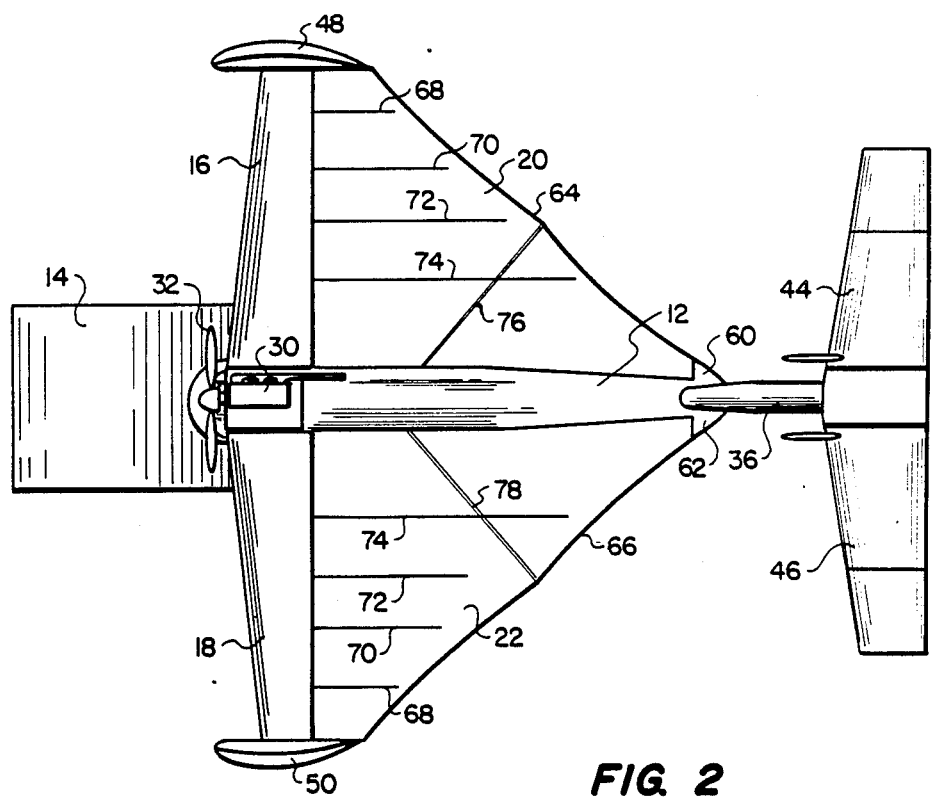
FIG. 2 is a top plan view of the embodiment of FIG. 1.
Figure 3:
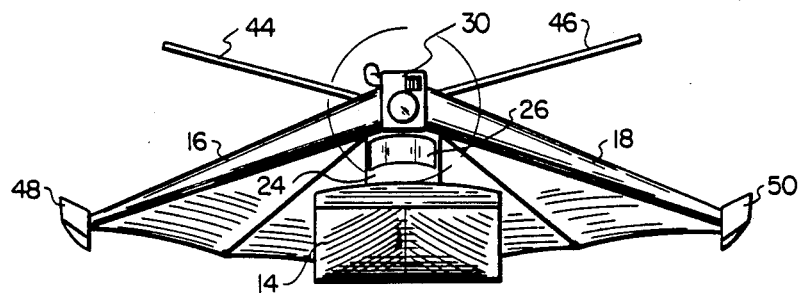
FIG. 3 is a front elevation view of the embodiment of FIG. 1.

The wing structure is completed by generally triangular shaped panels 20 and 22 of pliable material such as a Dacron or Nylon fabric secured along the forward edge to the trailing edge of the forward wing members 16 and 18 and extending backward and secured along the side of the fuselage 12 and to outward extensions 60 and 62 of the fuselage at the tail end thereof. A support cable 64 and 66 extends from each of the floats 48 and 50 to the back end of the fuselage for supporting the trailing edge of the flexible wing structure (FIG. 2). A plurality of battens 68-74 (i.e. elongated stiffeners) for assisting in holding the shape of the wings are sewn or secured into elongated pockets extending along parallel to the longitudinal axis of the craft. These may be constructed to be removable during folding of the wings, as shown in FIG. 4. A pair of struts 76 and 78 are hinged to and extend outward from the side of the fuselage and outward to connect to the cables for additional support of the wing structure.

The above described structure of wings and the aerodynamic hull function and cooperate to provide a stable vehicle for operation within the ground effect region above the surface of a body of water or other terrain over which the vehicle may traverse. The wing structure, as above described, forms a ram type wing trapping ram air below the wing structure, forcing it downward, for additional support of the vehicle. The structure, as shown for example in FIG. 5, is such that the hull extends from one-half to two-thirds the length thereof forward of the leading edge of the main wings of the vehicle. This, together with the spacing between the wings and hull and angle between the chords of the hull and wings, provides an efficient arrangement for stable operation in the ground effect region. The angle between the chords of the wing and hull may be on the order of between about two and ten degrees with around three and one-half degrees found to be the preferred angle for optimum stability. The hull preferably has a chord length of about half that of the wing and also has an approximate area (plan view) of about one-half that of the wing. The hull has a beam to length ratio of about 1:2.

Referring to FIGS. 6-9, an illustration of the relationship of the center of gravity and the center of pressure for the hull and the wings is illustrated in the sequential drawings. This illustration shows the shift in series of pressure relative to one another under conditions moving from water 200 support of the craft in FIG. 6 to various spacings of air support within and at the upper region of the surface effect region. As the craft moves above the surface effect region, the center of pressure for the wings move forward such that, for a given power setting, they tend to angle upward, thus increasing the drag and thereby reducing the forward speed thereof. The combination of hull and aircraft wings, as arranged and above described, provides a unit or vehicle which achieves an equilibrium within the surface effect region such that it can be easily trimmed to fly in this region without the necessity of constant undue correction.

As seen in FIG. 5, the illustrated craft may be provided with the usual controls such as is found in aircraft such as a yoke or stick 80 for controlling of the elevons 84 and 86 and with foot pedals 82 for controlling the rudders 39 and 40. The cabin may be equipped with two or more seats 84 and 86 for the pilot and one or more passengers as may be accommodated in the cabin of the craft.

The above described vehicle may be contstructed in small enough units to be folded in a compact arrangement for ease of storage and for ground transport along highways and roadways.

Figure 11:
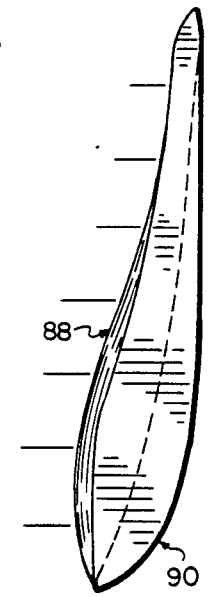
FIG. 11 is a side elevation view of the hull.
Figure 12:
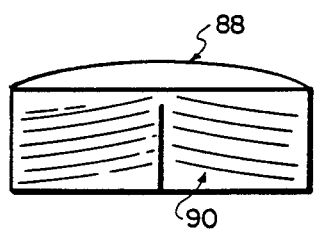
Figure 27:
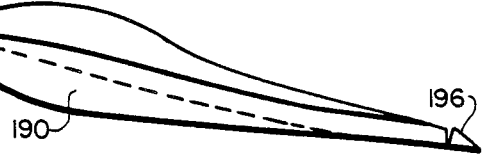
FIGS. 26 through 33 are views like FIGS. 10-19 of an alternate embodiment of the hull.
Figure 33:
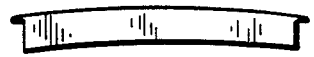
Figure 32:
Figure 31:
Figure 30:
Figure 29:

Referring to FIGS. 10-19, details of the overall profile of the aero-hydrodynamic hull is illustrated. As can be seen in FIGS. 11 and 12, the hull upper surface 88 has a generally airfoil upper configuration with a somewhat convex configuration. The lower surface 90 of the hull, in side view, curves from a point above the water line at the chord thereof downward to a surface at the water line back to a point from one-third to one-half the length thereof to a substantially straight line to the tail end thereof.

Figure 19:
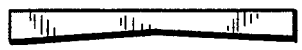
FIGS. 12-19 are a front elevation and successive section views along the length of the hull.
Figure 18:
Figure 17:
Figure 16:
Figure 15:
Figure 14:
Figure 13:
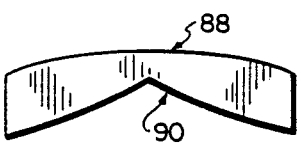
Figure 10:
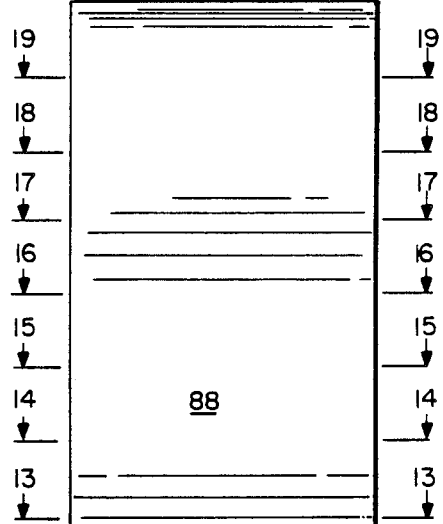
FIG. 10 is a top plan view of the aero-hydrodynamic hull.

In front view, it is shown in FIGS. 12-19 the under surface has a concave inverted V configuration extending along the longitudinal axis thereof curving from the front edge to the side edges and back to a substantially flat planing surface at the tail end thereof as shown in FIG. 19. This configuration provides an optimum combination aero-hydrodynamic hull.

Referring to FIGS. 20-22, an alternate embodiment of the vehicle in accordance with the invention is illustrated. In this embodiment, an aero-hydrodynamic hull 92, substantially like the previous embodiment, has mounted on top thereof a wing or airfoil combination 94 having a generally rectangular configuration in plan view (FIG. 21) and an airfoil configuration in side or elevation view, as shown in FIG. 20. The wings in this and the other embodiments (i.e., FIGS. 2, 21, and 24) have an aspect ratio (i.e. chord to span) of about 1:1. The wing structure includes slab side panel or boom members 96 and 98 extending backward from the wing structure on each end of the wing. Each boom or side panel 96 and 98 includes a vertical stabilizer structure 100 and 102 on which is mounted a movable rudder 104 and 106. Connected between the vertical stabilizers 104 and 106 is a horizontal V-shaped horizontal stabilizer 108 having movable combination elevators ailerons 110 and 112 (called elevons). These are connected to a control system within the cockpit for movement individually or together such that they may act as elevators or ailerons for controlling the pitch or roll of the aircraft.

A water rudder 114 extends downward from the rear end of the wing structure for extending into the water for steering of the craft while water supported.

Mounted at the front of the wing structure is an engine 116 driving a propeller 118 for air propulsion of the vehicle. In a similar manner as previously described, the engine may also drive water screws or jets (not shown) for the purpose of water propulsion.

A pilot cockpit 120 is mounted on top of the wing structure providing an elevated position for increased or improved pilot visibility. The same general type of configuration of combined aero-hydrodynamic hull and wing structure is maintained as in the previous embodiment. The same relative positioning and angular orientation is maintained to provide the optimum performance in the surface effect region. The side panels 96 and 98 of the wing structure extend downward at ninety degrees from the wing structure (FIG. 22) forming floats 122 and 124 for increased water stability. The hull 92 is attached to the rigid fuselage structure by an aerodynamic trunion 126 extending upward therefrom.

The horizontal stabilizer 108 and elevons 110 and 112 traverse both of the vertical stabilizers 100 and 102 forming a dihedral angle of approximately twenty degrees. Hinged to the aft of the rigid or horizontal stabilizer 108 are the elevons 100 and 102 which serve to control the craft in the lateral and longitudinal plane, that is, in pitch and roll.

Referring now to FIGS. 23–25, a still further embodiment of the invention is illustrated. This vehicle is designed as a high speed surface effect vehicle and comprises a hull 128 fabricated from a suitable material such as wood, metal or plastic. The hull structure 108 in this embodiment includes an integral aerodynamic vertical trunion 130 to which is attached the main plane wing structure 132. In addition, the vertical trunion 130 serves to house the pilot compartment as well as passenger and/or cargo compartments. The compartment is provided with a suitable windshield 134 as well as side windows 136 for visibility.

Immediately above this trunion/compartment structure is the main wing structure 132 which is of a rather complex shape, and as seen in FIG. 24, has a slight sweep back at the leading edge 138 and then dividing forming two separate airfoils tapering along the inner trailing edges 140 and 142 to a point aft while the outer edges 144 and 146 remain parallel to the center line or longitudinal axis of the craft. The upper surface of these airfoils are cambered and set at an anhedral angle to each other as can be seen in FIG. 25 curving downward to each side. At the lowermost point of the outer edge of the wing structure, the underside of the airfoil is extended down below the plane of the flat underside and is conventionally shaped to fulfill the function of wing tip hydroplaning surfaces 148 and 150.

At approximately the halfway point along the outer edges 144 and 146 of the wing structure, a vertical stabilizer 152 and 154 extends upward from the tail end of each side thereof. A horizontal stabilizer 156 of a generally V configuration extends between the two vertical stabilizers 152 and 154. Pivotally attached to the horizontal stabilizers are elevons 158 and 160 which function together or independently for controlling the pitch and roll axis of the craft. These are free to move up or down through approximately fifteen degree angle. Attached to each of the vertical stabilizers is a aerodynamic rudder 162 and 164 which controls the aircraft about its yaw axis. The control surfaces all are preferably fitted with suitable trim tabs.

Two separate water rudders 166 and 168 are attached to a common axis about which the air rudders pivot and operate in unison therewith and with each other. The water rudders 166 and 168 add additional directional control while the craft is negotiating in the water. The vehicle is provided with an air propulsion system comprising one or more engines 170 drivingly connected to a pair of ducted fans or propellers 172 and 174 aligned side by side parallel to the axis of the vehicle. These ducted propellers provide improved efficiency in the propulsion of the vehicle and may each rotate in opposite direction to each other to balance propeller torque.

Located approximately halfway along the side of the slab sides of the wing structure are a pair of ducts 176 and 178 controlled with a pair of doors. These are controlled by the driver or pilot of the vehicle from the cockpit and permit trimming of the craft in the lateral plane by allowing the ram wing pressure on the underside to be discharged to ambient outside air.

Provision is made for water propulsion which, as shown in FIG. 25, is in the form of twin screws 180 and 182 drivingly connected to the engine of the craft. These are used for maneuvering the vehicle on the water and assist in the acceleration of the craft to its transition point between planing and skimming. These propellers are then retracted when the craft is in the skimming mode, thus reducing the drag thereof.

Two separate hydrodynamic trim tabs 184 (only one shown) are mounted on the trailing edge of the hull. These trim tabs are activated by the pilot or driver from the cockpit and operate independently of all other control surfaces. These serve to adjust the trim of the hydroplaning hull in situations where cargo or passengers are not equally distributed throughout the craft.

Figure 26:
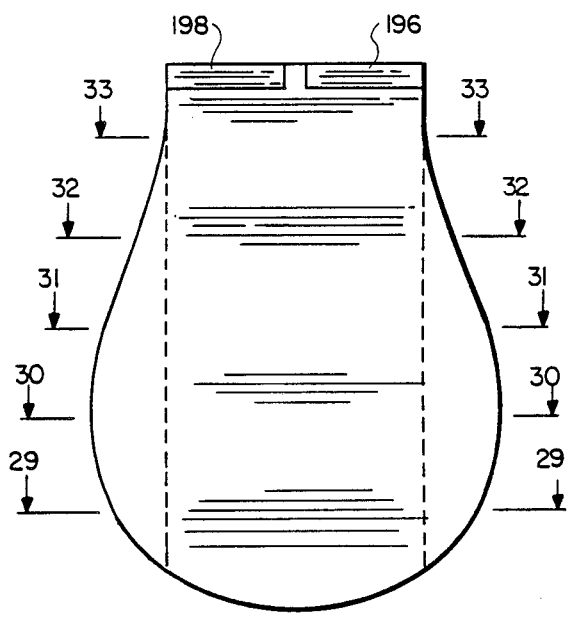
Figure 28:
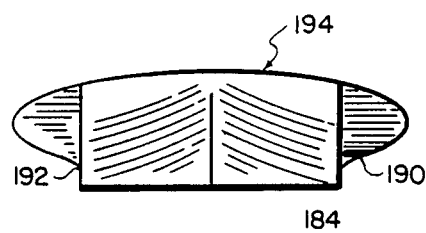

Referring now to FIGS. 26–33, a hull similar to hull 128, which is specifically designed to be hydrodynamically stable while planing and aerodynamically stable when attached to and used in conjunction with a ram wing or surface effect craft, is illustrated. This hull designated generally by the numeral 186 has a bottom 188 that is concave at the stem and gradually contours to a flat planing surface at the stern or rear end (FIGS. 28–33). Port and starboard sides 190 and 192 are shear forming an angle of ninety degrees to the waterline and run parallel to the center line of the hull. The upper surface 194 of the hull is cambered laterally and longitudinally extending over beyond the parallel side edges and returns to an acute angle to intersect the shear sides at approximately ninety degrees (FIGS. 29–33). The periphery of the overhung camber thus forms continuous curved surface from stern to the point where it blends just forward of the stern transom (FIG. 26). Attached to the transom by way of pivot points are two separate trim tabs 196 and 198 which are free to move vertically above or below the line of the underside planing surface and may be either mechanically electromechanically or hydraulically operated in unison or independently of one another.

The above described craft provides a combination of structural features defining a craft that functions quite efficiently within the surface effect region just above the surface of a body of land or water through which or over which the craft may travel. This above-described craft provides a vehicle intermediate that of ocean going water bone vessels and high speed aircraft. This provides an ocean or water going vessel that is capable of providing an efficient low cost transportation at speeds intermediate that of the typical ocean going vessel and the conventional aircraft.

While I have illustrated and described my invention by means of specific embodiments, it is to be understood that numerous changes and modifications may be made therein without department from the spirit and scope of the invention as defined in the appended claims.

I claim:

1. A surface effect vehicle for operation predominately within the region of ground effect, comprising:

an aero-hydrodynamic hull having a longitudinal axis, a hydrodynamic under surface and an aerodynamic lift upper surface;

said hull having a lower portion having generally parallel sides, an upper surface that is cambered both laterally and longitudinally and extending over the parallel sides forming a continuous curve from the stern to the forward end;

an aerodynamic wing structure secured to and disposed a predetermined distance above said hull with the axis thereof extending generally transverse to said longitudinal axis, wherein the lift surfaces and center of lift of said hull and said wing are coupled and positioned relative to one another for achieving aerodynamic stability within the region of ground effect, the leading edge of said wings are spaced a distance of about one-half to about two-thirds the length of the hull behind the leading edge and the lower surface of said wings are spaced a distance of about one-third to one-half the length of the hull above the upper surface of said hull, said wing structure curves downward from the longitudinal axis outward to a pair of straight parallel tips that form floats extending backward and upward to form vertical tail fins, the trailing edge of said airfoil dividing at the longitudinal axis separating into outward tapering edges to the aft end;

the chord line of the wing and the chord line of the hull are at an angle of between about two and six degrees to one another with the trailing edges diverging;

a pair of elevons mounted between said tail fins;

operator compartment means disposed on one of said hull and said wing structure for containing an operator and controls for said vehicle;

propulsion means mounted on said hull and positioned to provide a thrust along said longitudinal axis; and control means manipulable from said operator's compartment for controlling said vehicle.

2. A surface effect vehicle according to claim 1 wherein a pair of vent openings controllably vent pressure from the under side of the wing to the upper surface thereof.

3. A surface effect vehicle according to claim 1 wherein the area of the hull in plan view is on the order of about one-half the area of said wings.

4. A surface effect vehicle according to claim 2 wherein the area of the hull in plan view is on the order of about one-half the area of said wings.

5. A surface effect vehicle according to claim 1 wherein said vehicle has at least one power plant and water propulsion means driven by said power plant for propelling said vehicle in the water, an air propulsion means driven by said power plant for propelling said vehicle in the air.

6. A surface effect vehicle according to claim 2 wherein said vehicle has at least one power plant and water propulsion means driven by said power plant for propelling said vehicle in the water, an air propulsion means driven by said power plant for propelling said vehicle in the air.

7. A surface effect vehicle according to claim 3 wherein said vehicle has at least one power plant and water propulsion means driven by said power plant for propelling said vehicle in the water, an air propulsion means driven by said power plant for propelling said vehicle in the air.

* * * * *